United States Patent

Peuster et al.

[11] Patent Number: 5,881,853
[45] Date of Patent: Mar. 16, 1999

[54] ARRANGEMENT FOR ACTUATING A CHANGE-SPEED GEARBOX SHIFT MECHANISM AND FOR ENGAGING AND DISENGAGING A MAIN CLUTCH

[75] Inventors: Carsten Werner Peuster, Esslingen; Martin Stengel, Urbach; Guenter Woerner, Kernen, all of Germany

[73] Assignee: Daimler-Benz AG, Germany

[21] Appl. No.: 923,870

[22] Filed: Sep. 4, 1997

[30] Foreign Application Priority Data

Sep. 4, 1996 [DE] Germany ................. 196 35 867

[51] Int. Cl.⁶ ............................................. B60K 41/22
[52] U.S. Cl. ........................ 192/3.56; 74/335; 192/66.23; 192/84.6
[58] Field of Search ................. 192/3.56, 3.55, 192/66.23, 84.6, 89.21; 74/335

[56] References Cited

U.S. PATENT DOCUMENTS

| | | |
|---|---|---|
| Re. 21,828 | 6/1941 | Fleischel ..................... 192/3.56 X |
| 815,642 | 3/1906 | Sears ........................... 192/3.55 X |
| 1,074,599 | 10/1913 | Bradley ........................ 192/3.56 |
| 2,344,593 | 3/1944 | Brownlee ..................... 192/66.23 |
| 4,664,217 | 5/1987 | Welch et al. ................ 192/3.55 X |
| 5,357,821 | 10/1994 | Haka et al. . |

FOREIGN PATENT DOCUMENTS

| | | |
|---|---|---|
| 0 527 389 A1 | 2/1993 | European Pat. Off. . |
| 1405575 | 5/1965 | France . |
| 549383 | 4/1932 | Germany . |
| 43 36 446 A1 | 4/1995 | Germany . |
| 875310 | 8/1961 | United Kingdom . |
| 1127966 | 3/1968 | United Kingdom . |

Primary Examiner—Rodney H. Bonck
Attorney, Agent, or Firm—Evenson, McKeown, Edwards & Lenahan, P.L.L.C.

[57] ABSTRACT

An arrangement actuates the shift mechanism of a change-speed gearbox and engages and disengages a main clutch via a common servomotor. The shift mechanism, with the interposition of an auxiliary clutch which can be engaged and disengaged by a servomotor, can be actuated independently of the main clutch.

5 Claims, 3 Drawing Sheets

ARRANGEMENT FOR ACTUATING A CHANGE-SPEED GEARBOX SHIFT MECHANISM AND FOR ENGAGING AND DISENGAGING A MAIN CLUTCH

BACKGROUND AND SUMMARY OF THE INVENTION

This application claims the priority of German application 196 35 867.1, the disclosure of which is expressly incorporated by reference herein.

The present invention relates to an arrangement for actuating the shift mechanism of a change-speed gearbox and for engaging and disengaging a main clutch arranged upstream of the change-speed gearbox in the flow of force. In particular, an auxiliary mechanism transforms a rotary motion of a mechanism input member into a reciprocating motion of a mechanism output member allocated to the main clutch, and an auxiliary mechanism transforms a rotary motion of a mechanism input member into a reciprocating motion of a mechanism output member allocated to the shift mechanism. A device drives the mechanism input members of the two auxiliary mechanisms by a common servomotor, and a device couples and uncouples the mechanism output member allocated to the shift mechanism with regard to its drive connection relative to the device for driving the mechanism input members.

In an earlier arrangement of the foregoing type known to the applicants, an electric motor is in drive connection with the worm of a worm gear unit. The worm wheel is arranged in a Notionally fixed manner relative to the two mechanism input members used in the form of one eccentric each. The one eccentric interacts with a clutch disengaging lever of the main clutch and the other eccentric interacts with a fork-shaped link on the one lever arm of a differential lever. The other lever arm has a toothed segment which engages in a rack profile of a shift rod of the shift mechanism.

Consequently, the clutch disengaging lever and the shift rod are in such a fixed kinematic allocation to one another that, during a gear shift, the main clutch is first always completely disengaged, then the instantaneous gear is disengaged, subsequently the shift lane of the new gear is selected (with a separate selecting device), then in further sequence the new gear is engaged, and finally the main clutch is re-engaged. This sequential progression of the actuations of the main clutch and shift mechanism leads in each case to a long shift time during the gear shifts.

DE 43 36 446 A1 discloses an arrangement for actuating a main clutch to be provided in the flow of force between a drive motor and a change-speed gearbox. An electric motor is connected by a worm gear unit to an eccentric disc of an auxiliary mechanism for transforming a rotary motion into a reciprocating motion and the output member of the latter acts on the main clutch. The eccentric disc is also coupled to a spring-energy accumulator for assisting the clutch actuation.

EP 0 527 389 A1 discloses a further arrangement for shifting a two-stage axle drive of a utility vehicle. A spring-energy accumulator, as a function of the position of a device (e.g., a clutch) controls the flow of force of the drive torque to the drive axle and can be connected in the shift-force transmission between the shift mechanism at the axle drive and an electric shift motor. Thereby, the shift is carried out only when the flow of force to the drive axle is interrupted. The electric motor acts on a worm gear unit, the worm wheel of which has an eccentric which engages in a slotted-link guide of the input member of the spring-energy accumulator for transforming a rotary motion into a reciprocating motion.

An object of the present invention is to shorten the shift time in such an arrangement. This object is advantageously achieved according to the invention by providing that the two mechanism input members are connected to one another by an auxiliary clutch used as the device for coupling and uncoupling the mechanism output member allocated to the shift mechanism, and in that the auxiliary clutch, irrespective of the position of the mechanism output member allocated to the main clutch, can be engaged and disengaged by a clutch final control element derivable by a servomotor.

In one embodiment of the arrangement according to the present invention, the basic configuration of the mechanical change-speed gearbox is not altered, but all shift and control elements can be adaptively arranged at the periphery of the surrounding zone of the gearbox. The shift times can be markedly reduced by activating the control functions at the same time or at overlapping times (declutching and shifting as parallel function steps). By the use of only one actuator and a few control elements, the overall complexity and thus the costs can be kept down without functional disadvantages having to be tolerated.

In automated change-speed gearboxes, the problem may arise that, due to shifts always being associated with an interruption in tractive force on account of the gearbox design, a lack of comfort as a result of the occurrence of vehicle longitudinal vibrations may be felt in certain operating states (e.g. accelerating actions) due to the interruption of the drive moment. In the arrangement according to the present invention, therefore, it is of particular advantage that critical shift manoeuvres take place in a short time sequence. Declutching and shifting into neutral can be carried out at the same time in order to achieve the desired shift-time gain, in which case electronic engine management may be incorporated in the control.

However operating states, e.g. driving downhill, also occur in which a sequential progression of the actuations of main clutch and shift mechanism is necessary from the functional point of view. In this respect, too, the arrangement according to the present invention provides the precondition for variable use of the individual functions in the control of the gear shift.

In the arrangement according to the invention, a worm gear unit can be driven via an actuator (servomotor in electromechanical or hydraulic basic configuration). The worm gear unit activates, via an eccentric, the engagement and disengagement of the main clutch and, in sequence therewith or parallel thereto, the shifting and selecting action. Unlike a prior arrangement known to applicants, the shifting and selecting function in the arrangement according to the present invention can be initiated via a frictional or positive auxiliary clutch, which can be engaged and disengaged by a clutch final control element driven by a servomotor, such that an optimum operating sequence results. All basic functions performed here may be realized in a modular type of construction, including an electronic control unit for the shift sequence.

In the arrangement according to the present invention, the shifting and selecting operations may be carried out in a manner previously described in U.S. patent application Ser. No. 08/818,358, filed Mar. 17, 1997 or according to German Application Serial No. 196 35 866.3-14. The relevant function units may likewise be accommodated in the drive module.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
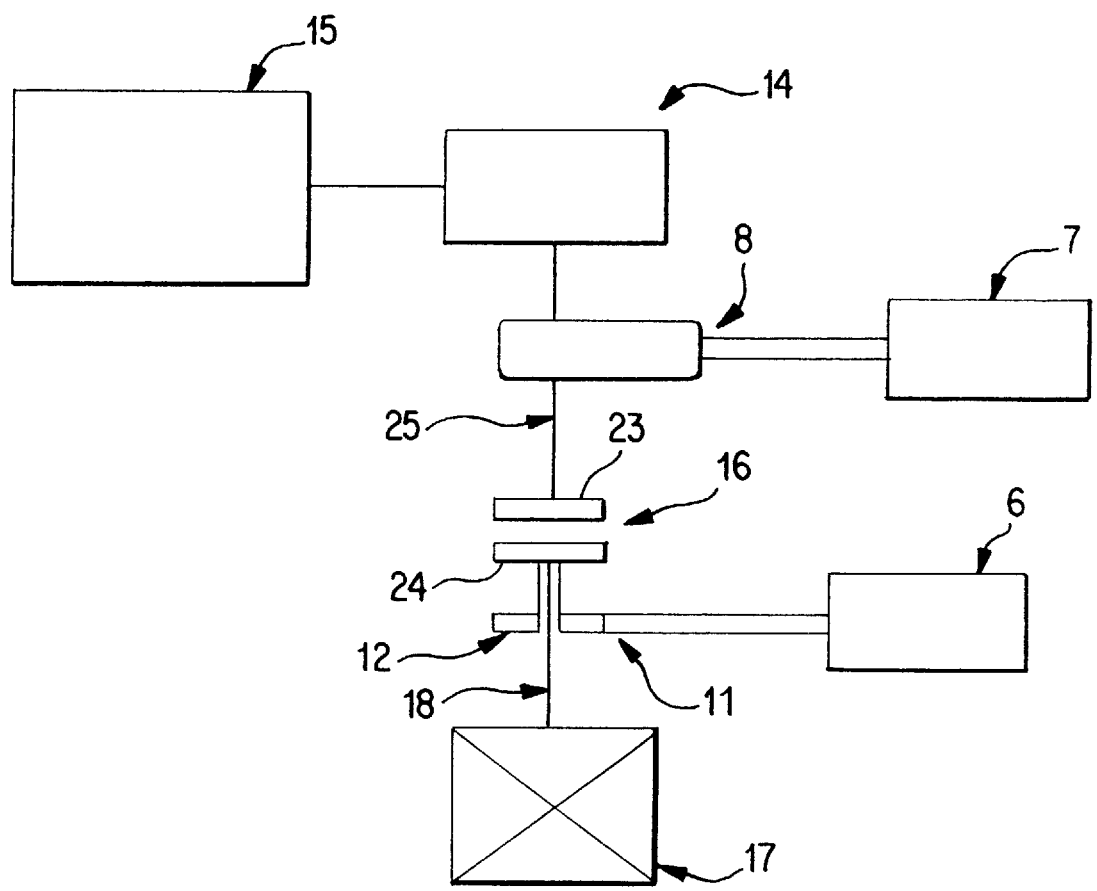
FIG. 1 is a schematic diagram of an arrangement for actuating a shift mechanism and for engaging and disengaging a main clutch according to the present invention.

A change-speed gearbox shift mechanism 6 and a main clutch 7 arranged upstream of the change-speed gearbox in the flow of force are actuated by a common electric servomotor 15. The servomotor 15, via a rotary speed reducer device 14, acts with an output-side intermediate shaft 25 on a first auxiliary mechanism 8 for transforming a rotary motion into a reciprocating motion for engaging and disengaging the main clutch 7 and on a second auxiliary mechanism 11 for transforming a rotary motion into a reciprocating motion for actuating the shift mechanism 6.

Figure 2:
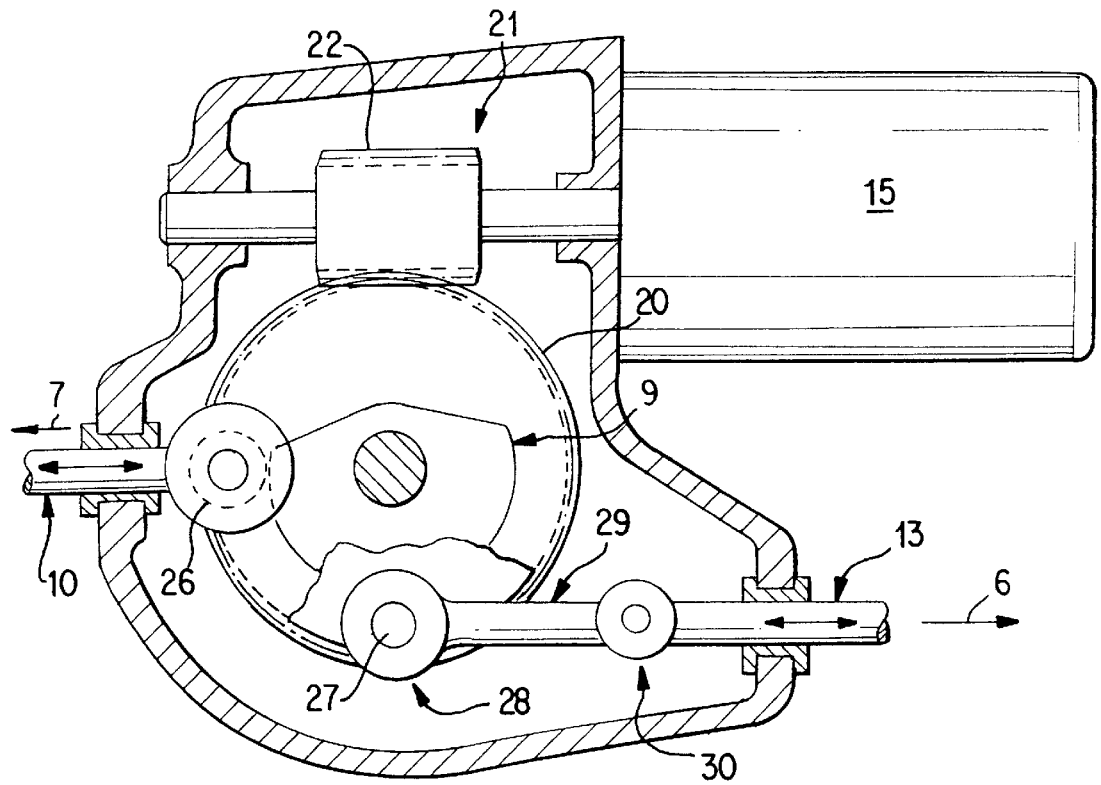
FIG. 2 is a more detailed representation of the arrangement of FIG. 1 in partial cross-sectional side view.

As seen in FIG. 2, the servomotor 15 is in direct drive connection with a coaxial worm 22 of a worm gear unit 21, the worm wheel 20 of which, like the one clutch half 23 of an auxiliary clutch 16, is arranged in an equally rotationally fixed manner relative to a coaxial intermediate shaft 25.

Figure 3:
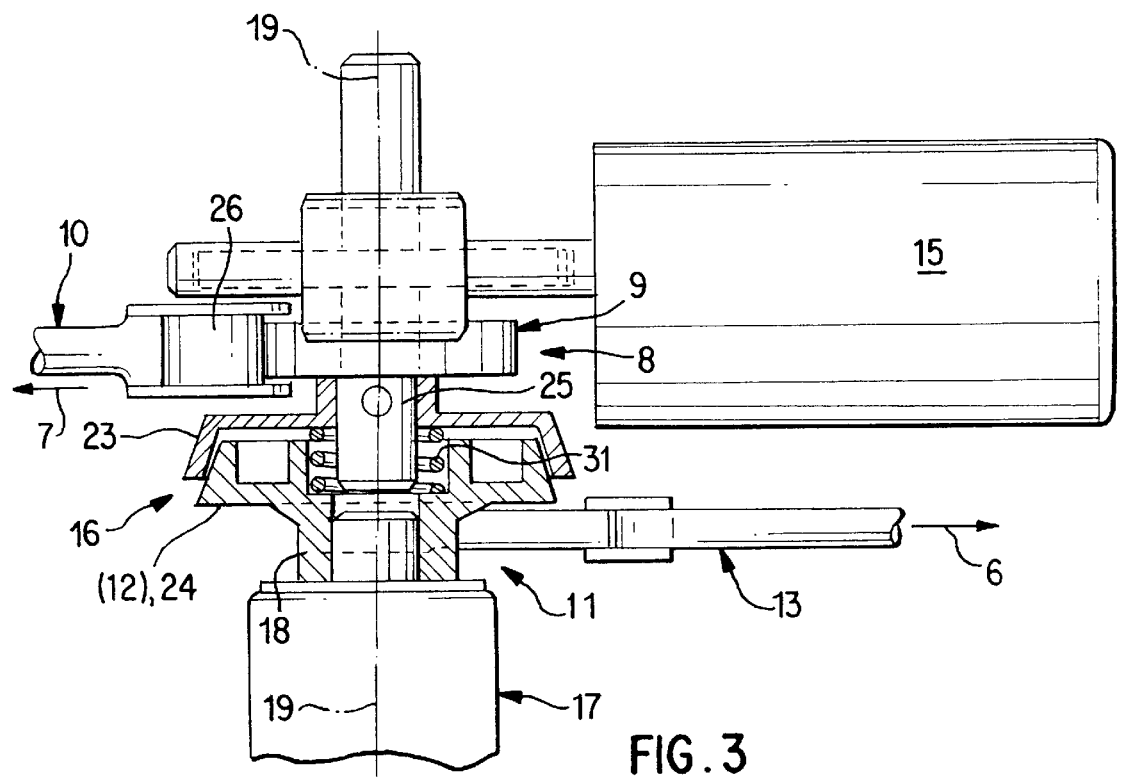
FIG. 3 is a likewise more detailed representation of the arrangement of FIG. 1 in a partial cross-sectional top view.

In FIGS. 2 and 3, the auxiliary mechanism 8 has a mechanism input member in the form of a cam plate 9, which is arranged in a rotationally fixed manner with regard to worm wheel 20 and intermediate shaft 25 and interacts with a follower in the form of a roller 26 which is rotatably mounted on the one end of a mechanism output member in the form of a linkage 10 performing reciprocating motions. The linkage 10 is operatively connected to the clutch disengaging lever of the main clutch 7.

The other clutch half 24 of the auxiliary clutch 16, arranged with its clutch axis in alignment with the rotational axis 19—19 of the worm wheel 20 and the intermediate shaft 25, is arranged in a Notionally fixed manner or in one piece with regard to an eccentric disc which is used as mechanism input member 12 of the second auxiliary mechanism 11 and has a crank pin 27. The latter (i.e., crank pin 27) is arranged eccentrically relative to the rotational axis 19—19 and is connected via a uniaxial joint 28 to a coupling rod 29. The coupling rod 29, in turn, is operatively connected via a further uniaxial joint 30 to the one linkage end of a linkage performing reciprocating motions as mechanism output member 13 of the auxiliary mechanism 11, in which case the linkage 13 can be used as a final control element of the shift mechanism 6 as described in aforementioned U.S. patent application Ser. No. 08/818,358, the disclosure of which is incorporated by reference herein. The final control element is arranged to be displaceable solely in the axial direction relative to a housing.

The other clutch half 24 of the auxiliary clutch 16 can be disengaged from the one clutch half 23 by at least one disengaging spring 31 and, via a sleeve-shaped clutch final control element 18 which can be driven by an electromagnet 17, can be engaged relative to the one clutch half 23, irrespective of the particular position of the mechanism output member 10, allocated to the main clutch 7, relative to the rotational axis 19—19.

Figure 4:
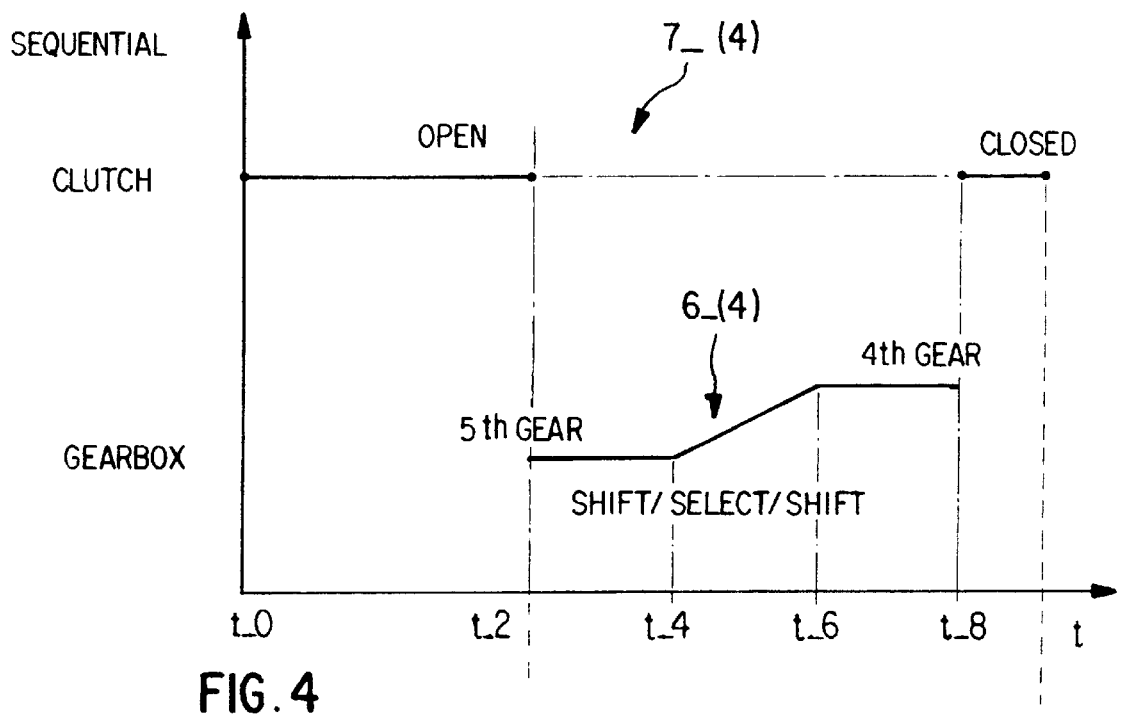
FIG. 4 is a diagram for the progression over time of the actuation of shift mechanism and main clutch during a gear shift in a previous arrangement.

It can be seen from the diagram of FIG. 4 that. a sequential progression, that is, a successive actuation of main clutch (cam train 7_(4)), and shift mechanism (cam train 6_(4)), was characteristic in a previous arrangement. If a shift signal, for example for a downshift from fifth gear to fourth gear, is activated at time t_0, first of all a time interval t_0–t_2, which is required for disengaging the main clutch, passes. An actuation of the shift mechanism begins at time t_2 to the effect that first of all the fifth gear is disengaged, in the course of which a time interval t_2–t_4 passes. A selecting motion for selecting the shift lane of the fourth gear is carried out at time t_4. This shift lane is reached at time t_6, so that the engaging of the fourth gear can be started, which is finally engaged at time t_8, and is followed by a last time interval t_8–t_9 for the re-engagement of the main clutch. Thereby, the shift time for the downshift "5-4" in the case of the prior art is equal to the time interval t_0–t_9.

Figure 5:
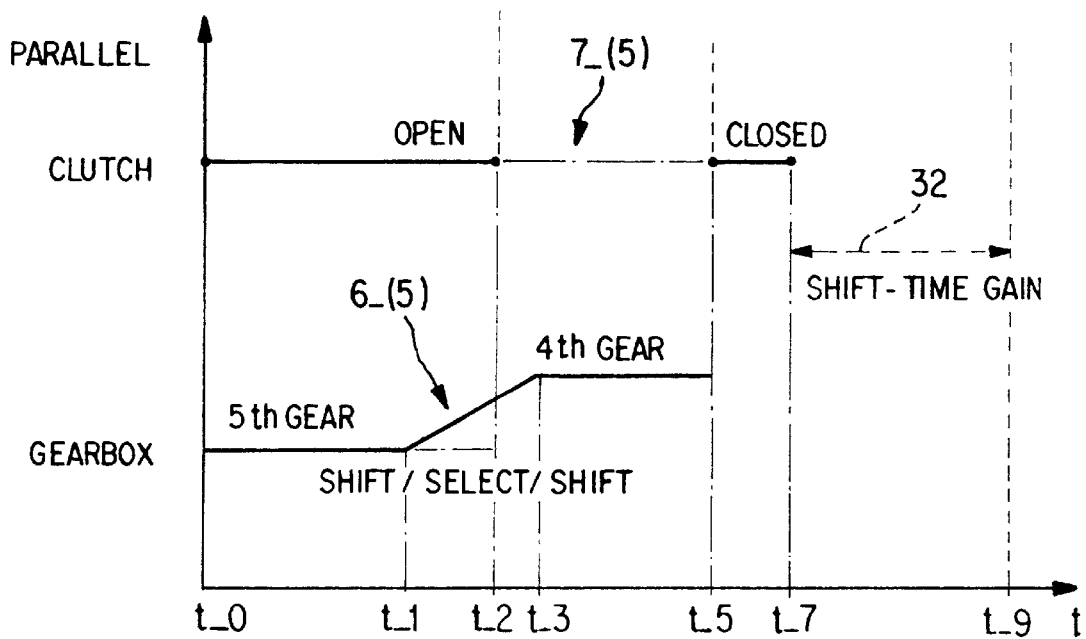
FIG. 5 is a diagram for the progression over time of the actuation of shift mechanism and main clutch during a gear shift in the arrangement according to the present invention.

In contrast, a considerable shift-time gain 32 is obtained in the arrangement according to the invention for the same downshift from fifth gear to fourth gear according to FIG. 5. When the shift signal appears at time t_0, not only is the disengagement of the main clutch 7 according to the cam train 7_(5) activated but so too is the disengagement of the fifth gear via the shift mechanism 6 according to the cam train 6_(5).

The disengagement of the fifth gear need not necessarily start at time t_0 but may also take place earlier or later, but always still before time t_2, at which the disengaging action for the main clutch 7 has ended. Consequently, the fifth gear is also already disengaged at time t_1, i.e., also still before time t_2. The subsequent selection of the shift lane for the fourth gear has already ended at time t_3, so that the following engagement of the fourth gear has likewise ended very early, i.e. at time t_5, which is substantially earlier than the corresponding time t_8 in previous arrangements. If an equal time interval t_8–t_9=t_5–t_7 for the re-engagement of the main clutch is taken as a basis in both cases, the shift-time gain 32 mentioned at the beginning for the "5-4" shift is obtained in the arrangement according to the invention.

Instead of a cone clutch, other known frictional clutches, such as multiple disc clutches, electrodynamic (induction) clutches, or even known positive clutches, such as dog clutches, toothed clutches, driving-key clutches, etc., can also be used for the auxiliary clutch within the scope of the present invention. Likewise, instead of an eccentric mechanism, a crank mechanism or a rack-and-pinion arrangement can also be used for the auxiliary mechanism 11 in the arrangement according to the present invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement for actuating a shift mechanism of a change-speed gearbox and for engaging and disengaging a main clutch arranged upstream of the change-speed gearbox in a force flow direction, comprising an auxiliary mechanism for transforming a rotary motion of a mechanism input member into a reciprocating motion of a mechanism output member allocated to the main clutch, an auxiliary mechanism for transforming a rotary motion of a mechanism input member into a reciprocating motion of a mechanism output member allocated to the shift mechanism, a device for driving the mechanism input members of the two auxiliary mechanisms by a common servomotor, and a device for coupling and uncoupling the mechanism output member allocated to the shift mechanism with regard to its associated drive connection relative to the device for driving the mechanism input members, wherein the two mechanism input members are connected by an auxiliary clutch comprising the device for coupling and uncoupling the mechanism output member associated with the shift mechanism, and the auxiliary clutch, independently of the position of the mechanism output member allocated to the main clutch, is engageable and disengageable by a clutch final control element derivable by a second servomotor.

2. The arrangement according to claim 1, wherein a clutch axis of the auxiliary clutch is arranged coaxially to a rotational axis of a worm wheel of a worm gear unit with a worm operatively connected to the common servomotor arranged coaxially therewith for driving the mechanism input members.

3. The arrangement according to claim 2, wherein the worm wheel and a clutch half of the auxiliary clutch are arranged in a rotationally fixed manner relative to a coaxial intermediate shaft.

4. The arrangement according to claim 3, wherein an electromagnet configured to perform linear stroke motions is operatively arranged for driving the clutch final control element of the auxiliary clutch and is coaxial to the intermediate shaft.

5. The arrangement according to claim 4, wherein the electromagnet is operatively connected to another clutch half of the auxiliary clutch by the clutch final control element.

* * * * *